Nov. 12, 1946. J. W. KELLY 2,410,978
HYDRAULIC SYSTEM
Filed Feb. 9, 1943
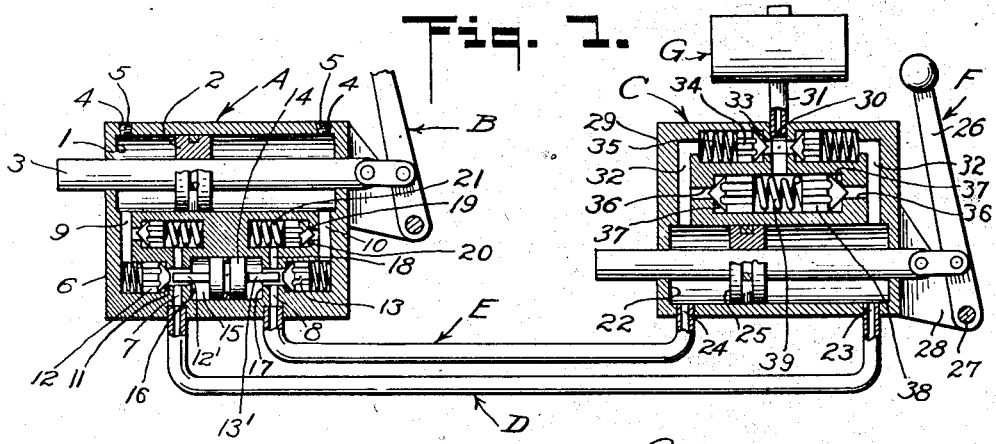
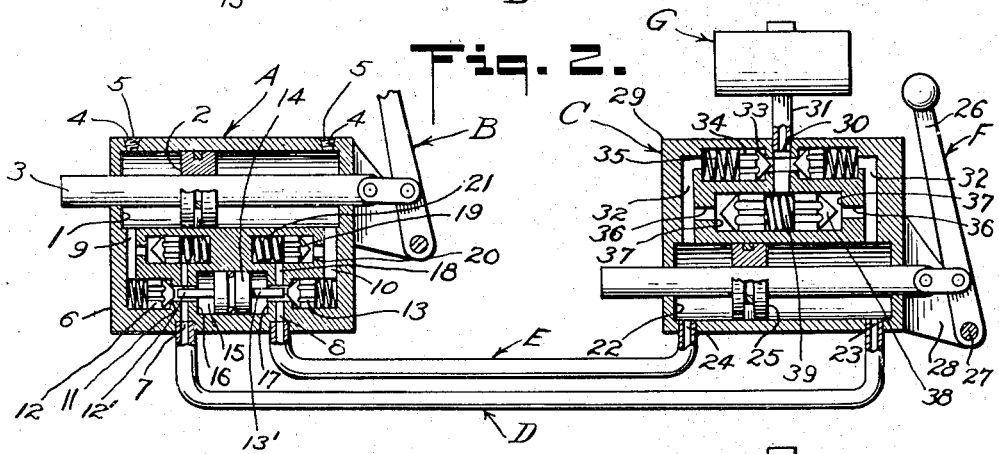
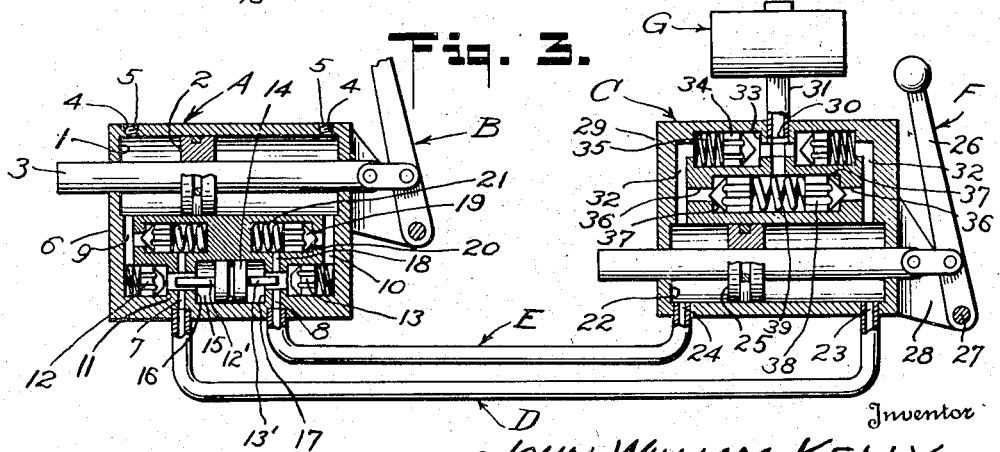
Inventor
JOHN WILLIAM KELLY
By R. S. Berry
Attorney Patented Nov. 12, 1946

2,410,978

UNITED STATES PATENT OFFICE 2,410,978

HYDRAULIC SYSTEM

John William Kelly, La Canada, Calif., assignor to Adel Precision Products Corp., a corporation of California Application February 9, 1943, Serial No. 475,301

9 Claims. (Cl. 60—54.5)

1

This invention relates to hydraulic control systems for aircraft and more particularly pertains to a manually operated hydraulic control system which is especially adapted for operating the throttles of aircraft engines or other aircraft controls or mechanisms subject to manipulation through the medium of such a system, rather than mechanical means or power operated hydraulic systems.

A primary object of this invention is to provide a highly efficient system of the character described wherein a hydraulic motor or driven unit having a novel arrangement of valves characterized by thermal expansion, thermal contraction and hydraulic locking functions is combined in such manner with a hand operated hydraulic pump unit including a source of supply of hydraulic fluid, and a novel arrangement of thermal expansion and thermal contraction relief valves coacting with corresponding valves in the motor unit, that under all temperature and operating conditions the motor unit will instantly and exactly respond to a corresponding operation of the pump unit to the end that a greater nicety and accuracy of control will be assured.

Another object of my invention is to provide a hydraulic control system of the character described in which the motor and pump units are similarly constructed of but few parts, certain of which are interchangeable to facilitate replacement and servicing operations, said units being exceptionally small and compact and light as to weight and subject to ready installation in small compass as is highly desirable in aircraft, also characterized by "built-in" control and thermal relief valves in an arrangement which assures the desired temperature compensation and synchronization of the two units.

Yet another object of this invention is to provide in a system such as described a motor unit wherein two valves serve as a hydraulic locking means, as return valves and also as automatic thermal contraction relief valves in coaction with thermal contraction relief valves in the pump unit, to the end that the number of valves, unit parts, the weight as well as the cost of the units are materially reduced and the system therefore greatly simplified and rendered more reliable of performance.

With the foregoing objects in view, together with such other objects and advantages as may subsequently appear, the invention resides in the parts and in the combination, construction and arrangement of parts hereinafter described and

2 claimed, and illustrated by way of example in the accompanying drawing, in which:

Fig. 1 is a semi-schematic view of a hydraulic control system embodying my invention with all valves closed and the motor unit hydraulically locked against movement from exterior forces;

Fig. 2 is a semi-schematic view corresponding to Fig. 1 but showing the thermal expansion relief valves as when opened to relieve excess pressure to the reservoir;

Fig. 3 is a semi-schematic view corresponding to Figs. 1 and 2 but showing the contraction relief valve as when opened due to contraction of the fluid in the system, to allow a compensating amount of fluid to be induced into the system from the reservoir.

Referring to the drawing more specifically, it is seen that a hydraulic control means and system embodying the invention hereof generally includes a motor unit A, a drive or power transmission means B operated thereby to actuate an airplane engine throttle or other airplane control, not shown, a manually operable master or pump unit C, fluid transmission lines D and E operatively connecting the pump and motor units, a manually operable means F for actuating the pump unit, and a reservoir G connected with the pump unit for thermal relief compensation purposes responsive to the automatic operation of valvular means coacting in said motor and pump units under temperature variations in the system to maintain the proper volume of fluid therein, as will be hereinafter more fully described.

As here provided the motor unit A comprises a hydraulic cylinder 1 in which a piston 2 is reciprocally mounted and operatively connected by means of a piston rod 3 with the power transmission or drive means B. Bleed ports 4 are provided adjacent the ends of this cylinder and are closed by means of plugs 5.

Associated with the cylinder 1 is a body member 6 having fluid transmission ports 7 and 8 opening on an outer face thereof and connected to the lines D and E respectively. Leading from the ports 7 and 8 through the body member 6 into opposite ends of the cylinder 1 are cylinder ports 9 and 10 affording the transmission of pressure fluid to the cylinder and the discharge of return fluid from the motor unit to the pump unit, also a thermal compensation flow of fluid to and from said cylinder.

Provided intermediate the ends of the cylinder ports 9 and 10 are valve seats 11 for spring loaded check valves 12 and 13 arranged to seat in a direction toward the ports 7 and 8 so as to hydraulically lock the piston 2 to maintain it in any position to which it is moved. These valves are adapted to be unseated by the operating fluid pressure transmitted through the ports 7 and 8, and will also be opened when thermal contraction of the fluid in the system takes place as will be hereinafter more fully described.

As a means for controlling the valves 12 and 13, a valve actuating piston 14 is reciprocally mounted in a cylinder portion 15 provided in the body member 6. This cylinder portion has end ports 16 and 17 opening into the cylinder ports 9 and 10 at points between the valve seats 11 and the ports 7 and 8.

The valve actuating piston 14 is provided with rod-like valve actuating members 12' and 13' extending from opposite sides thereof through the end ports 16 and 17 for engaging and unseating the valves 12 and 13. The valve actuating piston 14 and members 12' and 13' thereon are arranged so that normally the valves 12 and 13 are seated, but when pressure fluid is transmitted from the pump unit C, through one of the lines D and E, for example line E, the piston 14 is moved to the left causing member 12' to open valve 12, while the pressure of the operating fluid opens valve 13. Fluid pressure transmitted past the valve 13 in the cylinder port 10 is effective in the cylinder 1 to move the piston 2 to the left, while return fluid from the cylinder 1 is discharged through the port 9 past the open valve 12 into line D and back to the pump unit C. Upon cessation of transmission of pressure fluid through line E, the movement of the motor piston 2 ceases and the valve actuating piston assumes its neutral position allowing valve 12 to close; valve 13 having closed with the cessation of transmission of operating pressure. With both valves thus closed the motor piston 2 is hydraulically locked against movement and the airplane control operated thereby is therefore maintained in the position into which it is moved by the motor unit. The piston 2 of the driven unit is always locked in a position corresponding to that which the driving piston 25 occupies at any given time. Therefore the operator knows that the operated airplane control occupies a position corresponding to that to which he has adjusted the lever 26.

Built into the motor unit A is a thermal expansion compensating means coacting with similar means in the pump unit C and comprising thermal expansion relief ports 18 and spring loaded expansion relief valves 19. The relief ports 18 extend in the body member 1 so as to by-pass fluid under thermal expansion from the ends of the motor cylinder 1 around the valves 12 and 13 into the fluid transmission ports 7 and 8. Valve seats 20 are provided in the expansion relief ports 15 so that the valves 19 will seat in a direction toward the cylinder 1, being seated by the springs 21 therefor. These springs have a tension such that the valves 19 will not be opened by the normal pressure of the operating fluid in the ports 9 and 10, but will yield and allow the valves to open when the pressure of the fluid in ports 9 and 10 and cylinder 1, under thermal expansion, exceeds a predetermined pressure beyond that required to properly operate the motor unit piston 2.

The master or pump unit C as here provided is similar to the motor unit A and comprises a pump cylinder 22 having fluid transmission ports 23 and 24 at its ends to which ports the lines D and E are connected. In the cylinder 22 is a pump piston 25 which is subject to manual operation in either direction by means of the operating means F in the form of a lever 26 pivoted as at 27 on a bracket 28 on the cylinder 22.

Associated with the cylinder 22 is a pump unit body member 29 having a reservoir port 30 connected to the reservoir G by means of a line 31. Extending through the body member 29 from the ends of the cylinder 22 to the reservoir port 30 are contraction relief ports 32. Valve seats 33 for spring loaded check valves 34 are provided in the ports 32 at points spaced inwardly from the juncture of the ports 30 and 32, the valves being arranged to seat in a direction toward the reservoir port 30 and thereby being seated by the pressure of the operating fluid transmitted from the cylinder 22 through the ports 32. The springs 35 for the valves 34 are of such tension that when thermal contraction of the fluid in the system beyond a predetermined extent takes place, the valves 34 will open and a volume compensating amount of fluid from the reservoir G will be induced into the system, the valves 12 and 13 in the motor unit opening at this time to allow for similar volume compensation in the motor unit.

Also provided in the pump unit body member 29 are thermal expansion relief ports 36 which are arranged to communicate the reservoir port with the ends of the cylinder 22 through portions of the relief ports 32, the ports 36 by-passing the valves 34. In the expansion relief ports 36 are valve seats 37 for spring loaded check valves 38 arranged to seat toward the cylinder 22 and to unseat toward the reservoir port. The spring means 39 for seating the valves 38 exerts a force greater than the pressure of the operating fluid derived by manipulation of the pump piston, but will yield and allow the expansion relief valves 38 to open when the fluid in the system under thermal expansion exceeds a predetermined working pressure derived from the pump unit, thereby relieving to the reservoir G excess volume resulting from such thermal expansion.

The expansion relief valves 19 in the motor unit open substantially simultaneously with the opening of the expansion relief valves 38 in the pump unit, thereby making the desired expansion compensation in the two units and the lines D and E connected thereto.

With reference to Fig. 1 it is seen that my control system is in normal condition as when no thermal expansion or contraction is taking place and the pump and motor units are at rest with the motor unit hydraulically locked by reason of the valves 12 and 13 therein being closed to the outlet of fluid from the cylinder 1. When the system is in this condition it is apparent that the operator may move the pump piston in either direction to direct operating pressure to move the motor piston in correspondence to the movement of the pump piston.

Following the predetermined movement of the motor piston the valves 12 and 13 will close as hereinbefore explained and effect a hydraulic locking of the motor unit.

The reservoir G may if desired be pressurized to a predetermined extent so that the fluid in the entire system will be under a pressure which reduces the tendency of intaking air into the system but does not change the thermal expansion and contraction functions which are performed in the same manner as hereinbefore described.

When thermal expansion of the fluid produces a pressure beyond the normal or predetermined pump unit working pressure, the valves 19 in the motor unit and the corresponding valves 38 in the pump unit open responsive to this expansion pressure, as indicated in Fig. 2, thereby relieving excess pressure in the system into the reservoir G.

As shown in Fig. 3, when contraction of the fluid in the system takes place to a predetermined extent as determined by the force of the springs seating the valves 12 and 13 in the motor unit and the springs seating the valves 34 in the pump unit, the valves 12, 13 and 34 will open thereby inducing into the system an amount of fluid to compensate for the volume loss incident to such contraction of the fluid.

It is now seen that the thermal compensating provisions hereof make possible a substantially uniform volume and pressure in the system under varying temperatures thereby assuring exact and instant response of the motor unit to the pump unit.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a hydraulic control system, a motor unit cylinder, a piston reciprocable in said cylinder, a drive means operated by said piston, a body member associated with said cylinder, cylinder ports leading through said body member from an outer surface thereof to opposite ends of said cylinder, valves intermediate the ends of said ports and closing toward the outer ends of said ports to normally provide a hydraulic lock for said piston, springs normally seating said valves and yielding to allow the valves to open responsive to pressure of operating fluid transmitted to said ports, as well as when a predetermined thermal contraction of the fluid in the system takes place whereby in the latter instance fluid will be induced into said cylinder, a cylinder portion in said body member having end ports opening into said cylinder ports between the outer ends of the latter and said valves, a valve actuating piston movable from a neutral position into a valve actuating position responsive to the transmission of operating fluid to said cylinder portion through either of said cylinder ports and either of said end ports, valve actuating members operating upon movement of said valve actuating piston into an actuating position to unseat one of said valves to allow return fluid to flow from said motor unit cylinder and one of said cylinder ports, thermal expansion relief ports arranged in said body member to by-pass fluid around said valves from the ends of said cylinder into the outer ends of said cylinder ports, spring loaded expansion relief valves arranged in said relief ports to be unseated only when the pressure of the fluid under thermal expansion exceeds a predetermined working pressure of the fluid transmitted to said motor unit, a pump unit cylinder, fluid transmission lines between the ends of said pump unit cylinder and the outer ends of said motor unit cylinder ports, a pump piston in said pump unit, means for reciprocating said pump piston, a pump unit body member associated with said pump cylinder, a reservoir port in said pump unit body member, a source of supply of hydraulic fluid connected with said reservoir port, thermal contraction relief ports extending through said pump unit body member from the ends of said pump cylinder to said reservoir port, spring loaded contraction relief valves arranged to open said contraction relief ports only responsive to said predetermined contraction of fluid in the system whereby fluid from said source of supply will be induced through said reservoir port into said cylinders and the lines therebetween, fluid expansion relief ports in said pump unit body member arranged to by-pass fluid around said contraction relief valves from said pump cylinder into said reservoir port; and spring loaded expansion relief valves arranged in the last named expansion relief ports to open only when the pressure of the fluid in the motor and pump units and said lines under thermal expansion exceeds said predetermined working pressure of the operating fluid in the system.

2. In a closed hydraulic control system, a motor unit cylinder, a piston reciprocable in said cylinder, a drive means operated by said piston, a body member associated with said cylinder, cylinder ports leading through said body member from an outer surface thereof to opposite ends of said cylinder, valves intermediate the ends of said ports and closing toward the outer ends of said ports to normally provide a hydraulic lock for said piston, springs normally seating said valves and yielding to allow the valves to open responsive to pressure of operating fluid transmitted to said ports as well as when a predetermined thermal contraction of the fluid in the system takes place whereby in the latter instance fluid will be induced into said cylinder, a cylinder portion in said body member having end ports opening into said cylinder ports between the outer ends of the latter and said valves; a valve actuating piston movable from a neutral position into a valve actuating position responsive to the transmission of operating fluid to said cylinder portion through either of said cylinder ports and either of said end ports, valve actuating members operating upon movement of said valve actuating piston into an actuating position to unseat one of said valves to allow return fluid to flow from said motor unit cylinder and one of said cylinder ports, thermal expansion relief ports arranged to by-pass fluid past said valves from the ends of said cylinder into the outer ends of said cylinder ports, spring loaded expansion relief valves arranged in said relief ports to be unseated only when the pressure of the fluid under thermal expansion exceeds a predetermined working pressure of the fluid transmitted to said motor unit, a pump unit, and two fluid supply and withdrawal conduits connected with said pump unit, one of said conduits communicating with one of said cylinder ports, and the other of said conduits communicating with the other of said cylinder ports, and a source of supply of fluid under pressure connected in said system to receive fluid therefrom and introduce fluid thereto responsive to thermal expansion and contraction of the fluid in the system.

3. In a closed hydraulic control system, a hydraulic motor unit, a body member associated therewith, operating ports leading through said body member from an outer surface thereof to said motor unit, valves in said ports arranged to seat toward the outer ends of the ports to provide a hydraulic lock for said motor unit, springs seating said valves and yielding to allow the valves to open responsive to the pressure of operating fluid transmitted to said operating ports as well as when a predetermined thermal contraction of fluid takes place in the system, a fluid responsive valve operating means in said body member subject to movement for unseating the valve in one of the operating ports when operating fluid is transmitted to the other port and releasing the valve in said one port upon cessation of the transmission of operating fluid to said other port, thermal expansion relief ports arranged to by-pass fluid past said valves from said motor unit to the outer ends of said operating ports, spring loaded expansion relief valves arranged to be unseated and open said relief ports only when the pressure of the fluid under thermal expansion exceeds the predetermined working pressure of the fluid transmitted to said motor unit, a pump unit, two fluid supply and withdrawal conduits connected with said pump unit, one of said conduits communicating with one of said cylinder ports and the other of said conduits communicating with the other of said cylinder ports; and a source of supply of fluid under pressure connected in said system to receive fluid therefrom and introduce fluid thereto responsive to thermal expansion and contraction of the fluid in the system.

4. In a closed hydraulic control system, a motor unit cylinder, a piston reciprocable in said cylinder, a drive means operated by said piston, a body member associated with said cylinder, cylinder ports leading through said body member from an outer surface thereof to opposite ends of said cylinder, valves intermediate the ends of said ports and closing toward the outer ends of said ports to normally provide a hydraulic lock for said piston, springs normally seating said valves and yielding to allow the valves to open responsive to pressure of operating fluid transmitted to said ports as well as when a predetermined thermal contraction of the fluid in the system takes place whereby in the latter instance fluid will be induced into said cylinder, a cylinder portion in said body member having end ports opening into said cylinder ports between the outer ends of the latter and said valves; a valve actuating piston movable from a neutral position into a valve actuating position responsive to the transmission of operating fluid to said cylinder portion through either of said cylinder ports and either of said end ports, valve actuating members operating upon movement of said valve actuating piston into actuating positions to unseat one or the other of said valves to allow return fluid to flow from said motor unit cylinder and one or the other of said cylinder ports, thermal expansion relief ports for by-passing fluid past one or the other of said valves from said cylinder to the outer end of one or the other of said cylinder ports, spring loaded expansion relief valves aranged in said expansion relief port to be unseated only when pressure of the system fluid under thermal expansion exceeds a predetermined pressure, a pump unit, two fluid supply and withdrawal conduits connected with said pump unit, one of said conduits communicating with one of said cylinder ports, and the other of said conduits communicating with the other of said cylinder ports; and a source of supply of fluid under pressure connected in said system to receive fluid therefrom and introduce fluid thereto responsive to thermal expansion and contraction of the fluid in the system.

5. In a closed hydraulic control system, a hydraulic motor unit, a body member associated therewith, operating ports leading through the body member from an outer surface thereof for conveying fluid to and from said motor unit, valves in said ports arranged to seat toward the outer ends of said ports, springs seating said valves and yielding to allow the valves to open responsive to the pressure of operating fluid transmitted to said operating ports as well as when a predetermined thermal contraction of fluid takes place in the system, a fluid responsive valve-operating means in said body member subject to movement for unseating the valve in one of said ports when operating pressure is transmitted to the other port and for releasing the valve in said one port upon cessation of the transmission of operating pressure to said other port, thermal expansion relief ports arranged in said body member to by-pass fluid around said valves from said motor unit to the outer ends of said operating ports, spring loaded expansion relief valves arranged in said relief ports to be unseated when the pressure of the fluid under thermal expansion exceeds a predetermined pressure, a pump unit cylinder, fluid transmission lines connecting said operating ports with said pump unit cylinder, a pump unit piston in said cylinder, means for reciprocating said piston, a pump unit body member associated with said cylinder, a reservoir port in said pump unit body member, a reservoir fluid under a predetermined pressure connected to said reservoir port and applying pressure to the fluid throughout the system, thermal contraction relief ports in said pump unit body member affording communication between said cylinder and said reservoir port, spring loaded contraction relief valves arranged in the last named contraction ports to open responsive to a predetermined contraction of fluid in the system, fluid expansion relief ports in said pump unit body member for by-passing fluid around the contraction relief valves in said pump unit body member to said reservoir port, and spring loaded expansion relief valves in the last named expansion relief ports arranged to open when the pressure of fluid in the system under thermal expansion exceeds a predetermined pressure.

6. In a closed hydraulic system of the kind described, a hydraulic motor unit comprising a double acting piston, a hydraulic pump unit comprising a double acting piston, conduit lines for transmitting fluid under pressure from the pump unit to the motor unit to operate the piston of the latter in either direction, a closed fluid pressure supply reservoir in fluid communication with said system, a set of two-way thermal relief valves between said reservoir and both ends of one of said cylinders and a set of two way thermal relief valves between both ends of the other of said cylinders and the conduits connected thereto.

7. In a closed-circuit hydraulic motion-transmitting apparatus, a driving unit comprising a closed cylinder having a double acting piston mounted for reciprocation therein, a driven unit having a corresponding cylinder and piston, a pair of conduits connecting the ends of the driving unit cylinder with the ends of the driven unit cylinder, a reservoir connected with both ends of one of said cylinders and utilizable to impose a predetermined pressure on said apparatus, a pressure responsive locking valve structure between said units constructed and arranged to lock the driven piston at a position corresponding to that which the driving piston occupies at any given time, a two-way thermal relief valve mechanism between said reservoir and one of said units, and a two-way thermal relief valve mechanism between said units.

8. In a closed hydraulic system of the kind described, a hydraulic motor unit comprising a cylinder containing a double acting piston, a hydraulic pump unit comprising a cylinder containing a double acting piston, conduits connecting the ends of said pump unit cylinders with the corresponding ends of said motor unit cylinder, a closed fluid pressure supply reservoir connected to said conduits, a set of two-way thermal relief valves between said reservoir and both ends of said pump cylinder and a set of two-way thermal relief valves between both ends of the other of said cylinders and the conduits connected to them, and a locking valve structure arranged to lock the piston in adjusted position in said other cylinder, said locking valve structure including said last named set of thermal relief valves.

9. In hydraulic apparatus, a source of hydraulic pressure, a pair of conduits leading from said source of pressure to opposite ends of a double acting hydraulic motor, means to control delivery of said hydraulic pressure to said conduits, a locking valve means comprising a pair of oppositely disposed valves and an actuating element therefor interposed between said conduits and said motor and operative normally to prevent movement of said motor in the absence of the application of operating pressure through said conduits and simultaneously operative to accommodate fluid flow incident to thermal contraction of the fluid in said motor, and an oppositely disposed thermal relief valve associated with each of said locking valves constructed and arranged to accommodate fluid flow incident to the thermal expansion of fluid in said motor.

JOHN WILLIAM KELLY.